(12) United States Patent
Cottrell

(10) Patent No.: US 8,381,182 B2
(45) Date of Patent: *Feb. 19, 2013

(54) APPROACHES FOR MEETING SMI DURATION LIMITS BY TIME SLICING SMI HANDLERS

(75) Inventor: Andrew P. Cottrell, San Jose, CA (US)

(73) Assignee: Kinglite Holdings Inc., Singapore (SG)

( * ) Notice: Subject to any disclaimer, the term of this patent is extended or adjusted under 35 U.S.C. 154(b) by 331 days.

This patent is subject to a terminal disclaimer.

(21) Appl. No.: 12/715,315

(22) Filed: Mar. 1, 2010

(65) Prior Publication Data

US 2010/0153606 A1    Jun. 17, 2010

Related U.S. Application Data

(63) Continuation of application No. 10/217,751, filed on Aug. 13, 2002, now Pat. No. 7,698,689.

(51) Int. Cl.
*G06F 9/44* (2006.01)
(52) U.S. Cl. ........ 717/120; 717/104; 717/106; 717/123; 717/127
(58) Field of Classification Search .................. None
See application file for complete search history.

(56) References Cited

U.S. PATENT DOCUMENTS

| | | | |
|---|---|---|---|
| 5,357,628 A | 10/1994 | Yuen | |
| 5,511,204 A | 4/1996 | Crump et al. | |
| 5,615,331 A | 3/1997 | Toonians et al. | |
| 5,621,886 A | 4/1997 | Alpert et al. | |
| 5,758,168 A | 5/1998 | Mealey et al. | |
| 5,974,573 A | 10/1999 | Martin | |
| 6,094,729 A | 7/2000 | Mann | |
| 6,108,744 A | 8/2000 | Lebee | |
| 7,698,689 B2 * | 4/2010 | Cottrell | ........................ 717/127 |
| 2002/0156958 A1 | 10/2002 | Huang | |
| 2003/0005247 A1 | 1/2003 | Chang | |

FOREIGN PATENT DOCUMENTS

| | | |
|---|---|---|
| TW | 470885 | 1/2002 |
| TW | 515959 | 1/2003 |

OTHER PUBLICATIONS

International Search Report in PCT/US03/22253 dated Sep. 26, 2003 (4 pages).
Taiwanese Office Action in Taiwanese Patent Application No. 092119818 (3 pages).

* cited by examiner

*Primary Examiner* — Chuck Kendall
(74) *Attorney, Agent, or Firm* — Lowe Hauptman Ham & Berner, LLP

(57) ABSTRACT

Approaches that allow the context of an SMI task to be saved between SMIs. Upon entering an SMI handler for a task, a new task context stack is created. Thereafter, the SMI handler uses the task context, leaving the original stack unchanged. When the time limit for a single SMI is almost reached, the CPU is directed back to the original stack, and the task context stack persists in memory and retains the context of the task in hand. The soft SMI exits with an indication to signify that a new SMI should be invoked to continue processing. The entity that caused the first soft SMI then invokes another, passing in an indication to signify that this is a continuation of the prior task. On entering the SMI handler, the handler notes the request for continuation, switches to the saved task context stack and continues processing where it left off.

21 Claims, 3 Drawing Sheets

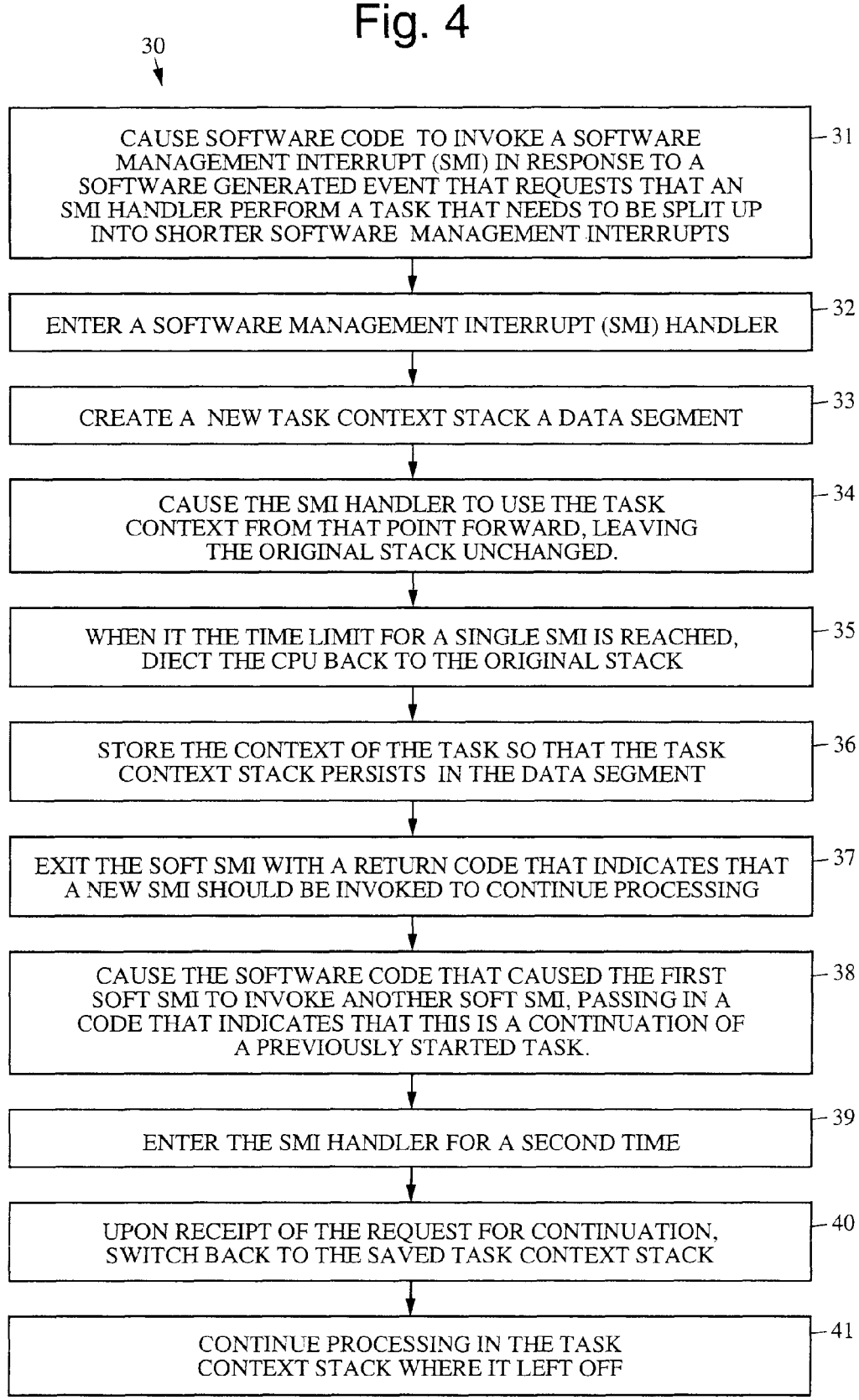

APPROACHES FOR MEETING SMI DURATION LIMITS BY TIME SLICING SMI HANDLERS

CLAIM OF PRIORITY

This application is a continuation of non-provisional patent application Ser. No. 10/217,751, filed Aug. 13, 2002, now U.S. Pat. No. 7,698,689, entitled "Method for Meeting SMI Duration Limits by Time Slicing SMI Handlers," by Andrew P. Cottrell, the entire contents of which are incorporated by reference for all purposes as if fully set forth herein.

FIELD OF THE INVENTION

The present invention relates to computers, and more particularly to a method for overcoming system management interrupt (SMI) duration limits by time slicing SMI handlers.

BACKGROUND OF THE INVENTION

As used herein, the term "soft SMI" means a system management interrupt (SMI) that occurs in response to a software-generated event, and is not generated by hardware alone. The term "service requestor" is a driver or other executable code that invokes an SMI to request that an SMI handler perform a certain task. The term "SMI handler" is a software routine that was specifically identified by the service requestor to perform the task. The term "SMI infrastructure" is a body of code that handles all SMIs, identifies the causes of the SMIs, and routes the execution path to the correct SMI handler for a given SMI cause. The term "SMM" refers to system management mode, which is a mode that a central processing unit (CPU) enters in response to an SMI event. The term "task" is a function or operation that is performed by the SMI handler for the service requestor.

The term "context" is a body of data that maintains the state of a task while it is executing, including a succession of return addresses, parameters passed between subroutines, and temporary intermediate variables. The context of a task in an SMI handler is normally stored on a stack. The term "task context stack" is a temporary stack created for storage of the context of the specific SMI handler. This stack persists between SMIs until the task is complete. The term "SMI duration" is the delay from the invocation of an SMI by the service requestor until the return of control back to the service requestor, and is a measure of the total time spent with the CPU in SMM for one SMI event. The term "SMI duration limit" is the maximum desired or permissible SMI duration.

Time spent in system management interrupt (SMI) mode is time spent away from the operating system (OS). While servicing an SMI, the OS is unable to task switch or service hardware interrupts. There is a practical limit as to how long an SMI can last before abnormal OS behavior is observed. A value of several hundred microseconds is often used as a maximum desirable SMI duration limit.

SMIs occur for two reasons. These are to service hardware events such as are used for power management or other system management events, and software events such as security operations or other runtime basic input/output system (BIOS) services. When the SMI occurs because a service was requested by software, this is called a software SMI or soft SMI. Many tasks that must be executed as a soft SMI take longer than the SMI duration limit. Particularly, complex cryptographic operations, for example, may take much longer.

One prior art solution is to break down these complex tasks into smaller subtasks and repeatedly invoke soft SMIs until the whole task is completed. This approach, however, calls for the re engineering of the task in such a way that it can be broken down into smaller tasks. It would be desirable to have a method that overcomes the problems and limitations of such prior art solutions.

SUMMARY OF THE INVENTION

The present invention comprises a method for use in a system comprising a central processing unit (CPU) that allows the context of a system management interrupt (SMI) task to be saved between SMIs. A driver or other software invokes or generates a soft SMI (in response to a software generated event) that requests that an SMI Handler perform a certain task that may need to be split up into shorter SMIs.

Upon entering the SMI handler, a new task context stack is created in memory. This memory could be a data segment within a system management memory region. From that point forward, the SMI handler uses the newly created task context stack, leaving the original context stack unchanged.

When the SMI duration limit for a single SMI is about to be reached, the CPU's stack pointer is directed back to the original context stack, the context of the task in hand is stored 36, and the new task context stack persists in memory and retains the context of the task that is to be suspended.

The soft SMI exits with a return code or other indication to signify that a new SMI should be invoked to continue processing. The driver or other software that caused the first soft SMI then invokes another, passing a code or other indicator that indicates that this is a continuation of a previously started task.

On re-entering the SMI handler, the SMI handler notes the request for continuation, switches back to the saved task context stack and continues processing where it left off. The task would be unaffected by the interruption, the behavior of the task would be the same with or without the flow of control returning to the service requestor and then back into the task.

BRIEF DESCRIPTION OF THE DRAWINGS

The various features and advantages of the present invention may be more readily understood with reference to the following detailed description taken in conjunction with the accompanying drawing figure, described by way of example, wherein like reference numerals designate like structural elements, and in which:

FIG. 4 is a flow diagram that illustrates an exemplary method in accordance with the principles of the present invention.

DETAILED DESCRIPTION

Figure 1:
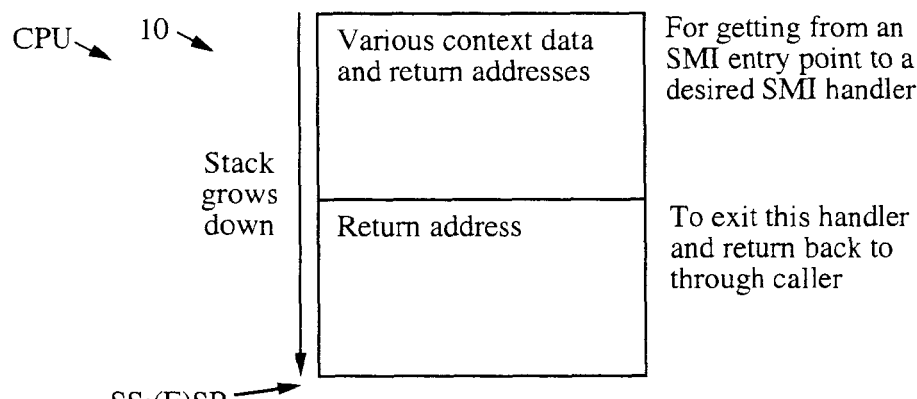
FIG. 1 illustrates an exemplary stack showing the stack state after execution flow has been routed by an SMI infrastructure to the correct SMI handler.
Figure 2A:
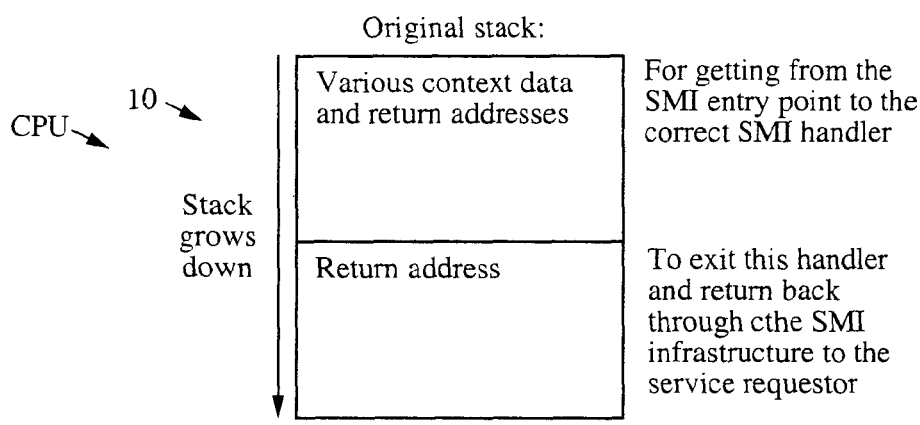
FIGS. 2a and 2b respectively illustrate original and task context stacks as they would be during the execution of a yield routine in accordance with the principles of the present invention.
Figure 2B:
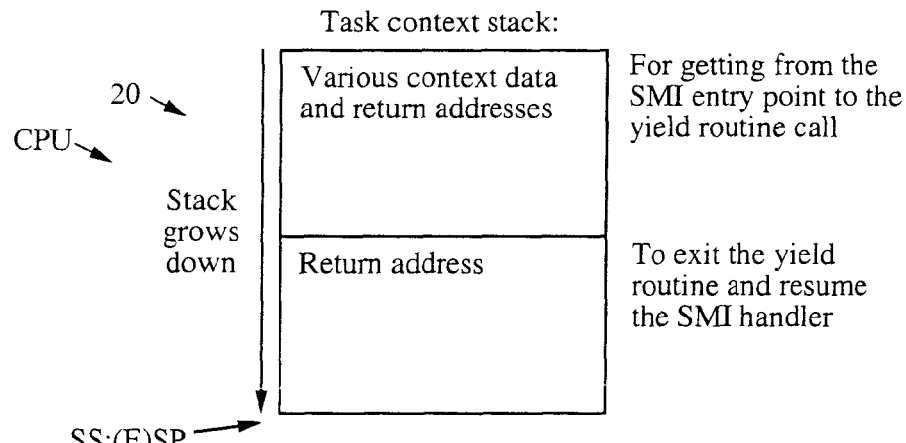
Figure 3A:
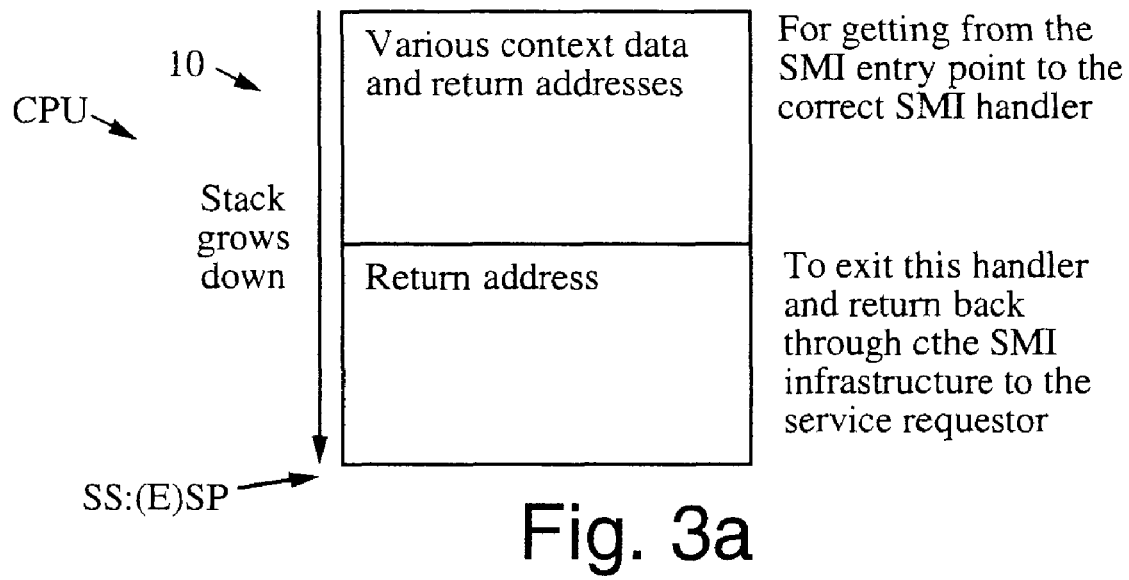
FIGS. 3a and 3b respectively illustrate original and task context stacks after the yield routine has switched the flow of execution back to the SMI handler.
Figure 3B:
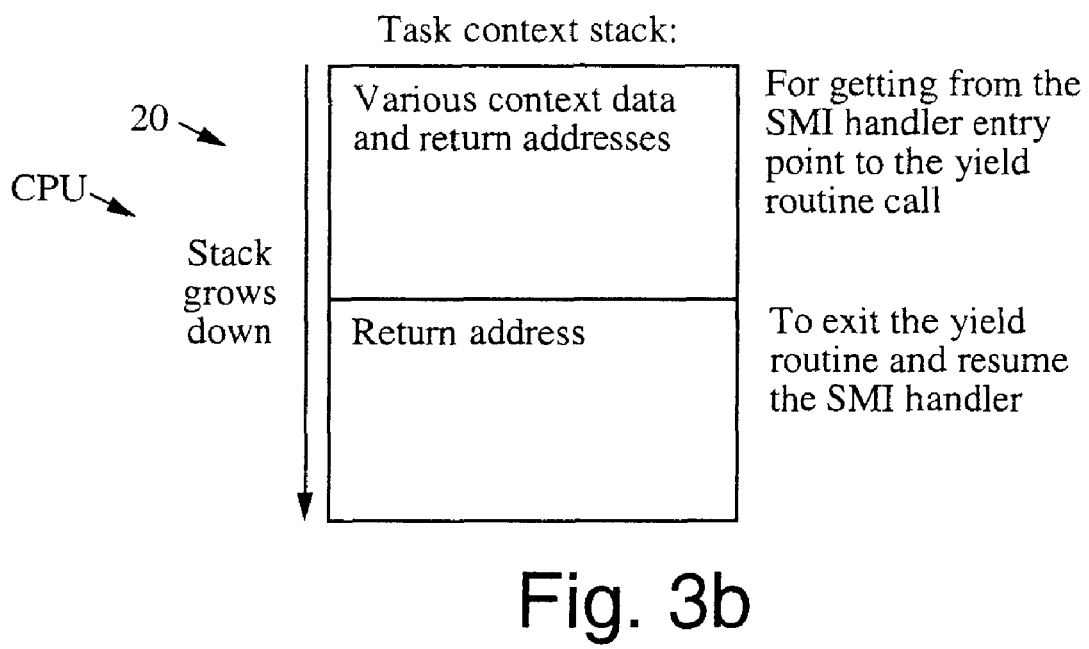

Referring to the drawing figures, FIG. 1 depicts a portion of a system comprising a central processing unit (CPU) having memory and illustrates an exemplary stack 10 showing the state of that stack after execution flow has been routed by an SMI infrastructure to a correct or desired SMI handler. Note that this initial state is common with many prior art implementations. FIGS. 2a and 2b respectively illustrate original and task context stacks 10, 20 inside a yield routine in accordance with the principles of the present invention. Note that SS:(E)SP (the CPU's stack pointer) points to the task context stack. FIGS. 3a and 3b respectively illustrate original and task context stacks 10, 20 after the flow of control has been returned to the SMI handler. Note that SS:(E)SP now points to the original stack.

A service requestor (a driver or other executable code) invokes an SMI handler, via a soft SMI in order to perform a complex processing task that will take longer than the SMI duration limit. The flow of execution is routed by the SMI infrastructure to the correct or desired SMI handler, as it normally would be. FIG. 1 illustrates the state of exemplary stack 10 after execution flow has been routed by the SMI infrastructure to the correct or desired SMI handler.

The SMI handler creates a new task context stack 20 (FIG. 2b) to store a new context associated with the task. The task regularly calls a yield routine to test if the SMI duration limit is about to be exceeded. Inside the yield routine, the original and task context stacks 10, 20 are as shown as depicted in FIGS. 2a and 2b, respectively.

If the yield routine determines that the SMI duration limit is about to be exceeded, it then adjusts SS:(E)SP (the stack pointer of the CPU) from the task context stack 20 back to the original context stack 10, sets a return code or other indicator to indicate to the service requestor that this is a mid-task exit from system management mode (SMM). The original and task context stacks 10, 20 are as shown in FIGS. 3a and 3b, respectively. The SMI handler then executes a return instruction. Flow of control passes back through the SMI infrastructure to the service requestor and the new task context stack 20 is preserved in SMM memory (memory reserved for system management mode operations).

On detecting that the return code or other indication denotes that the task has not completed, the service requestor issues another soft SMI to allow the task to continue, this time passing a code or other indication to signify that this is a continuation request. The flow of execution is routed by the SMI infrastructure to the correct SMI handler as before. At re-commencement of the SMI handler, the original and task context stacks 10, 20 are again as is shown in FIGS. 3a and 3b, respectively.

The flow of execution is routed by the SMI infrastructure to the correct SMI handler as normal. The SMI handler detects the indication that this is a continuation request and immediately switches the stack pointer SS:(E)SP back to the new task context stack 20. A return instruction is then executed which causes a return back into the interrupted flow of execution as if exiting from the yield routine. The task that executed the yield instruction is not affected by the exit and re-entry of SMI and continues as if the yield routine did nothing.

With reference to FIG. 4, it is a flow diagram that illustrates an exemplary method 30 in accordance with the principles of the present invention. The method 30 is used in a system comprising a central processing unit (CPU) that allows the context of an SMI task to be saved between SMIs.

A driver or other software (code) invokes 31 or generates 31 a soft SMI (in response to a software generated event) that requests that an SMI handler perform a certain task that needs to be split up into shorter SMIs. Upon entering 32 the SMI handler, a new task context stack is created 33 in memory. From that point forward, the SMI handler uses 34 the newly created task context stack, leaving the original context stack unchanged.

When the SMI time duration limit for a single SMI is about to be reached, the CPU is directed 35 back to the original context stack and stores 36 the context of the task in hand. The new task context stack persists in memory and retains the context of the task that is to be suspended.

The soft SMI exits 37 with a return code or other indication to signify that a new SMI should be invoked to continue processing. The driver or other software that caused the first soft SMI then invokes 38 another soft SMI, passing a code or other indicator that indicates that this is a continuation of a previously started task.

On re-entering 39 the SMI handler for a second time, the SMI handler notes the request for continuation, switches 40 back to the saved task context stack, and continues 41 processing where it left off. As far as the task is concerned, its behavior is unaltered by the interruption of its execution.

Security Considerations

Where security is an issue, SMI handlers must ensure that sensitive data is not visible outside of system management mode (SMM) memory during a yield back to the service requestor. One consequence of this is that buffers passed into the SMI handler must not be used to store intermediate data.

How to Yield

The above example yielded control from the SMI handler back to the service requestor when the SMI duration limit was reached by means of the SMI handler regularly calling a yield routine. An alternative, though far more complex approach, is to establish an interrupt or exception servicing environment in SMM which enables a timer or other event generator to be set to generate an interrupt or exception after a duration a little shorter than the SMI duration limit and force a yield without requiring the cooperation of the SMI handler code.

Implementation Issues

Multiple Contexts

The main purpose for yielding back to the service requestor's environment is so that hardware interrupts can be serviced. One of those interrupts may be a timer that causes a task switch in the operating system. Under this scenario, a new task may be started without completing the first task. It is necessary when implementing the present invention to deal with this, ensuring this there is one task context stack 20 for each SMI handler that knows how to yield, and also one for each service requestor that may call it.

Heap Management

If there is a memory heap available to the SMI handler, then care must be taken to avoid memory leaks. Allocations of memory must be associated with task contexts, and if a task context is destroyed, perhaps by calling the initial SMI a second time without completing the first, then the memory owned by that context must be released.

Hardware State

Care must also be taken not to yield without due regard to the state of hardware. If any hardware device, such as a floating-point unit (FPU), for example, contains a state that must be preserved between consecutive SMIs that comprise the execution of a task, then the yield function must save that state on the task context stack 20 before yielding.

Measuring Time Slices

Unless a timer interrupt is used, it may be difficult to establish when the SMI duration limit will be reached. Execution speed varies with many parameters including but not limited to processor and bus performance. One method to establish a time interval is to use a RDTSC (read time-stamp counter) instruction that reads the CPU time-stamp counter (TSC) that counts clock cycles. The duration or clock cycle intervals, however, can vary not only with processor, but with power management state. One way to be sure of the clock speed at any moment in time is to measure it.

An example solution is as follows. On some chipsets, a periodic SMI occurs at regular intervals. The handler for this interrupt would read the TSC, subtract the reading from the previous periodic SMI and calculate the clock speed. This value would change as the CPU throttles itself for power management. The TSC interval that corresponds to the SMI duration limit would then be calculable.

Another example is as follows. On some CPUs, various counters and timers are available that monitor the performance of the CPU by a variety of measures. Some of these measurements can be used to deduce the passage of a certain period of time. In some cases, it is possible for the achievement of the maximum value of the counter, or terminal value, to cause an exception or interrupt.

Using one of these performance-monitoring counters, the change in value associated with the SMI duration limit could be calculated. This value could be subtracted from the terminal count to provide the value that the performance-monitoring counter should be set to at the start of the each SMI invocation. The interrupt or exception caused by the counter would take place after the SMI duration limit had elapsed, and the SMI would exit back to the requestor with the task context preserved as before.

Thus, it can be seen that the present invention allows SMI handlers that would otherwise exceed acceptable execution times to be implemented without the need for re-architecting. This has particular application in the field of cryptography where certain standard operations are far slower than is acceptable for a single SMI.

Thus, a method for overcoming system management interrupt (SMI) duration limits by time slicing SMI handlers has been disclosed. It is to be understood that the described embodiments are merely illustrative of some of the many specific embodiments that represent applications of the principles of the present invention. Clearly, numerous and other arrangements can be readily devised by those skilled in the art without departing from the scope of the invention.

What is claimed is:

1. A method for context-switching when processing a system management interrupt (SMI), comprising:
   in response to receiving a first request to process a system management interrupt (SMI), creating, a second context stack that is different from a first context stack, wherein the first context stack comprises instructions currently being executed by a central processing unit (CPU);
   after creating the second context stack, directing the CPU to execute instructions in the second context stack, instead of executing instructions in the first context stack, to process the system management interrupt (SMI);
   upon determining that a time limit is about to expire, maintaining the state of the second context stack while directing the CPU to return to executing instructions in the first context stack; and
   in response to (a) receiving a second request to process a system management interrupt (SMI) and (b) determining that the second request requests the continuation of the performance of the same task requested by the first request, directing the CPU to return to executing instructions in the second context stack while maintaining the state of the first context stack.

2. The method of claim 1, wherein directing the CPU to return to executing instructions in the first context stack further comprises:
   notifying a service requestor that issued the first request that the second request should be issued to continue processing of the task requested by the first request.

3. The method of claim 1, wherein the second request comprises an indication that signifies that the system management interrupt (SMI), requested by the second request, was issued to continue the same task requested by the first request.

4. The method of claim 1, wherein the second context stack is maintained in a data segment within the system management memory region.

5. The method of claim 1, wherein directing the CPU to return to executing instructions in the first context stack comprises:
   updating the CPU's stack pointer to reference the first context stack.

6. The method of claim 1, further comprising:
   upon receiving the second request, a system management interrupt (SMI) infrastructure inspects the second request to determine the correct SMI handler, from a plurality of SMI handlers, to process the second request, wherein the correct SMI handler switches a stack pointer to refer to the second context stack.

7. The method of claim 1, wherein the first request is processed by a SMI handler that is configured to ensure that sensitive data is not visible outside the system management mode (SMM) memory during a yield back to a service requestor.

8. A machine-readable storage medium storing one or more sequences of instructions, which when executed, cause:
   in response to receiving a first request to process a system management interrupt (SMI), creating, a second context stack that is different from a first context stack, wherein the first context stack comprises instructions currently being executed by a central processing unit (CPU);
   after creating the second context stack, directing the CPU to execute instructions in the second context stack, instead of executing instructions in the first context stack, to process the system management interrupt (SMI);
   upon determining that a time limit is about to expire, maintaining the state of the second context stack while directing the CPU to return to executing instructions in the first context stack; and
   in response to (a) receiving a second request to process a system management interrupt (SMI) and (b) determining that the second request requests the continuation of the performance of the same task requested by the first request, directing the CPU to return to executing instructions in the second context stack while maintaining the state of the first context stack.

9. The machine-readable storage medium of claim 8, wherein directing the CPU to return to executing instructions in the first context stack further comprises:
   notifying a service requestor that issued the first request that the second request should be issued to continue processing of the task requested by the first request.

10. The machine-readable storage medium of claim 8, wherein the second request comprises an indication that signifies that the system management interrupt (SMI), requested by the second request, was issued to continue the same task requested by the first request.

11. The machine-readable storage medium of claim 8, wherein the second context stack is maintained in a data segment within the system management memory region.

12. The machine-readable storage medium of claim 8, wherein directing the CPU to return to executing instructions in the first context stack comprises:
   updating the CPU's stack pointer to reference the first context stack.

13. The machine-readable storage medium of claim 8, wherein execution of the one or more sequences of instructions further causes:
   upon receiving the second request, a system management interrupt (SMI) infrastructure inspects the second request to determine the correct SMI handler, from a plurality of SMI handlers, to process the second request, wherein the correct SMI handler switches a stack pointer to refer to the second context stack.

14. The machine-readable storage medium of claim 8, wherein the first request is processed by a SMI handler that is configured to ensure that sensitive data is not visible outside the system management mode (SMM) memory during a yield back to a service requestor.

15. A device capable of context-switching when processing a system management interrupt (SMI), comprising:
   one or more processors; and
   a machine-readable storage medium storing one or more sequences of instructions, which when executed by the one or more processors, cause:
      in response to receiving a first request to process a system management interrupt (SMI), creating, a second context stack that is different from a first context stack, wherein the first context stack comprises instructions currently being executed by a central processing unit (CPU);
      after creating the second context stack, directing the CPU to execute instructions in the second context stack, instead of executing instructions in the first context stack, to process the system management interrupt (SMI);
      upon determining that a time limit is about to expire, maintaining the state of the second context stack while directing the CPU to return to executing instructions in the first context stack; and
      in response to (a) receiving a second request to process a system management interrupt (SMI) and (b) determining that the second request requests the continuation of the performance of the same task requested by the first request, directing the CPU to return to executing instructions in the second context stack while maintaining the state of the first context stack.

16. The device of claim 15, wherein directing the CPU to return to executing instructions in the first context stack further comprises:
   notifying a service requestor that issued the first request that the second request should be issued to continue processing of the task requested by the first request.

17. The device of claim 15, wherein the second request comprises an indication that signifies that the system management interrupt (SMI), requested by the second request, was issued to continue the same task requested by the first request.

18. The device of claim 15, wherein the second context stack is maintained in a data segment within the system management memory region.

19. The device of claim 15, wherein directing the CPU to return to executing instructions in the first context stack comprises:
   updating the CPU's stack pointer to reference the first context stack.

20. The device of claim 15, wherein execution of the one or more sequences of instructions further causes:
   upon receiving the second request, a system management interrupt (SMI) infrastructure inspects the second request to determine the correct SMI handler, from a plurality of SMI handlers, to process the second request, wherein the correct SMI handler switches a stack pointer to refer to the second context stack.

21. The device of claim 15, wherein the first request is processed by a SMI handler that is configured to ensure that sensitive data is not visible outside the system management mode (SMM) memory during a yield back to a service requestor.

* * * * *